(12) United States Patent
Shimura

(10) Patent No.: US 6,658,197 B1
(45) Date of Patent: Dec. 2, 2003

(54) AUDIO SIGNAL REPRODUCTION APPARATUS AND METHOD

(75) Inventor: Fujio Shimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/390,393

(22) Filed: Sep. 3, 1999

(30) Foreign Application Priority Data

Sep. 4, 1998 (JP) .......................................... 10-251493

(51) Int. Cl.[7] .............................................. H04N 5/781
(52) U.S. Cl. ............................. 386/68; 386/75; 386/96; 360/73.08; 704/207
(58) Field of Search .......................... 386/6–8, 39, 40, 386/54, 68, 75, 81–82, 96–107, 124; 360/71, 73.01, 73.04, 73.05, 73.08; 704/207; H04N 5/76, 5/783

(56) References Cited

U.S. PATENT DOCUMENTS

| | | | | |
|---|---|---|---|---|
| 5,414,568 A | * | 5/1995 | Taki et al. ................. | 360/19.1 |
| 5,717,829 A | * | 2/1998 | Takagi ........................... | 360/8 |
| 5,873,059 A | * | 2/1999 | Iijima et al. ................. | 704/207 |
| 5,991,724 A | * | 11/1999 | Kojima et al. .............. | 704/266 |
| 6,360,198 B1 | * | 3/2002 | Imai et al. ..................... | 704/7 |
| 2002/0101368 A1 | * | 8/2002 | Choi et al. .................... | 341/61 |

* cited by examiner

Primary Examiner—Thai Tran
(74) Attorney, Agent, or Firm—Frommer Lawrence & Haug LLP; William S. Frommer

(57) ABSTRACT

The audio signal reproduction apparatus and method according to the present invention reproduces a digital audio signal recorded on a recording medium by a predetermined number of samples, at a recording medium travel speed different from the travel speed during the recording. The pitch control of the reproduced digital audio signal is performed as follows. When the reproduction speed of the recording medium is lower than the travel speed during the recording, in response to the reproduction speed, pitch is automatically controlled to a fixed or variable pitch. Even if the reproduction is at a lowered speed, it is possible to recognize the contents of conversation or melody of a music source as well as to distinguish from noise, thus enhancing the reproduction sound clearness.

5 Claims, 4 Drawing Sheets

AUDIO SIGNAL REPRODUCTION APPARATUS AND METHOD

BACKGROUND OF THE INVENTION

1. Field of the Invention

The present invention relates to an audio signal reproduction apparatus and method for reproducing at a speed different from the running speed of the recording medium when a data has been recorded.

2. Description of the Prior Art

In a video tape recorder using a magnetic tape for recording and reproducing a television signal, a digital video tape recorder (hereinafter, referred to as digital VTR) is used in practice as an apparatus for recording and reproducing a television signal without substantial deterioration.

This digital VTR records on a magnetic tape a television signal including a video signal, audio signal, control signal, and the like, as a digital data, and reproduced the digital data recorded on the magnetic tape.

The digital VTR records the digital data on an inclined recording track on the magnetic tape. This inclined recording track is formed by a rotary magnetic head (hereinafter, referred to simply as head) arranged with inclination in the longitudinal direction of the magnetic tape. A television signal of one frame after subjected to A/D conversion to obtain the aforementioned digital data is recorded on 10 adjacent tracks of the inclined recording track.

Among the digital VTR, there is an apparatus type allowing the user to select between a normal reproduction mode and a changed (slowed down) reproduction mode. In the normal reproduction mode, the tape travels at the same speed when recording has been performed. In the changed (slowed down) reproduction mode, the tape travels at a slower speed than the speed during recording.

For example, the digital data recorded on the magnetic tape by the digital VTR can be reproduced at a reduced speed by the JOG reproduction mode. However, this requires a pitch processing mainly related to the frequency of an acoustic stimulus.

Conventionally, in the jog reproduction mode, a pitch variable mode or a pitch fixed mode has been selected. That is, there has been no switching between the variable or fixed pitch mode in the jog reproduction.

On the other hand, if the pitch can be varied in the jog reproduction mode, as the reproduction speed is reduced the pitch is more lowered, and it becomes difficult to understand a conversation and it becomes impossible to isolate a word. When reproducing a music source, melody cannot be recognized. Moreover, in the reproduction processing, a valid number of data items decides the sound quality. If variable pitch lowers the speed and as the number of concealed data items increases, frequency of a noise component is lowered, the noise becomes offensive to the ear.

Moreover, if the pitch is fixed in the jog reproduction mode, when the reproduction speed is at super low, sound like "gaw gaw" is generated which cannot be isolated from the noise.

The conventional pitch processing has the aforementioned problems.

SUMMARY OF THE INVENTION

It is therefore an object of the present invention to provide an audio signal reproduction apparatus and method capable of properly switching between a pitch fixed area and a pitch variable area in the jog reproduction mode, so that contents of a conversation and a melody of a music source can be recognized, as well as enabling to distinguish them from a noise and improve the sound clearness.

The audio signal reproduction apparatus for reproducing a digital audio signal based on a predetermined number of samples which have been recorded on a recording medium, said apparatus comprising: a reproduction means for reproducing from the recording medium the digital audio signal based on the predetermined number of samples; a pitch control means for performing pitch control of the digital audio signal reproduced; a speed detection means for detecting a reproduction speed of the recording medium from elements of a travel mechanism of the recording means; and a pitch decision means responding to the output of the speed detection means, and in a case if the reproduction speed of the recording medium is lower than the travel speed of the recording, so that the pitch control means decides a pitch variable period and a pitch fixed interval.

Moreover, in the audio signal reproduction apparatus according to the present invention, it is preferable that the pitch control means include: a sample count identification means for identifying the sample count of the digital audio signal based on the predetermined number of samples; a total sample count calculation means for counting the total number of samples used for the pitch control, using the sample count data identified by the sample count identification means and a reproduction speed information of the recording medium; and interpolation calculation means for generating an interpolation data for said pitch control according to the data indicating the total sample count calculated by the total sample count calculation means, wherein the pitch decision means has a speed information calculation means for converting the speed information from the speed detection means, into a speed information indicating a pitch variable period and a pitch fixed period, and supplying this modified speed information as a travel speed information of the recording medium, to the total sample count calculation means.

Moreover, in the audio signal reproduction apparatus according to the present invention, it is also preferable that the pitch decision means further include a pitch variable/pitch fixed specification means for forming a speed data for specifying the pitch variable period or the pitch fixed period, wherein according to the speed data, the speed information calculation means modifies the speed information corresponding to the pitch fixed period, to a value identical to a normal reproduction speed of the recording medium.

Moreover, in the audio signal reproduction apparatus according to the present invention, it is also preferable that the pitch variable/pitch fixed specification means outputs a speed data to specify the pitch fixed period when the reproduction speed of the recording medium is $\frac{1}{3}$ to $\frac{1}{5}$ speed mode.

According to another aspect of the present invention, there is provided an audio signal pitch control method when reproducing a digital audio signal based on a predetermined number of samples, at a speed different from the speed of the recording medium travel during recording, the method comprising: a reproduction step for reproducing from the recording medium the digital audio signal based on the predetermined number of samples; a pitch control step for performing pitch control of the digital audio signal reproduced in the reproduction step; a speed detection step for detecting a reproduction speed of the recording medium from elements of a travel mechanism of the recording means; and a pitch decision step for deciding the pitch in response to the output of the speed detection step, so that if the reproduction speed of the recording medium is lower than the travel speed of the recording, the pitch control step decides a pitch variable period and a pitch fixed interval.

DETAILED DESCRIPTION OF PREFERRED EMBODIMENTS

Description will now be directed to an embodiment of the present invention with reference to the attached drawings. This embodiment is a digital VTR employing an example of the audio signal reproduction apparatus according to the present invention.

This digital VTR reproduces a digital data indicating a television signal recorded on a magnetic tape, and obtains the television signal.

Here, the television signal includes a video signal, an audio signal, control signal and the like.

This digital VTR, when reproducing a digital data from the inclined recording track on the magnetic tape, enables a user to select between a normal reproduction mode in which the magnetic tape travels at the same speed as when the digital data was recorded, and a variable reproduction mode (so called jog reproduction mode) in which the magnetic tape travels slower than when the digital data was recorded.

Figure 1:
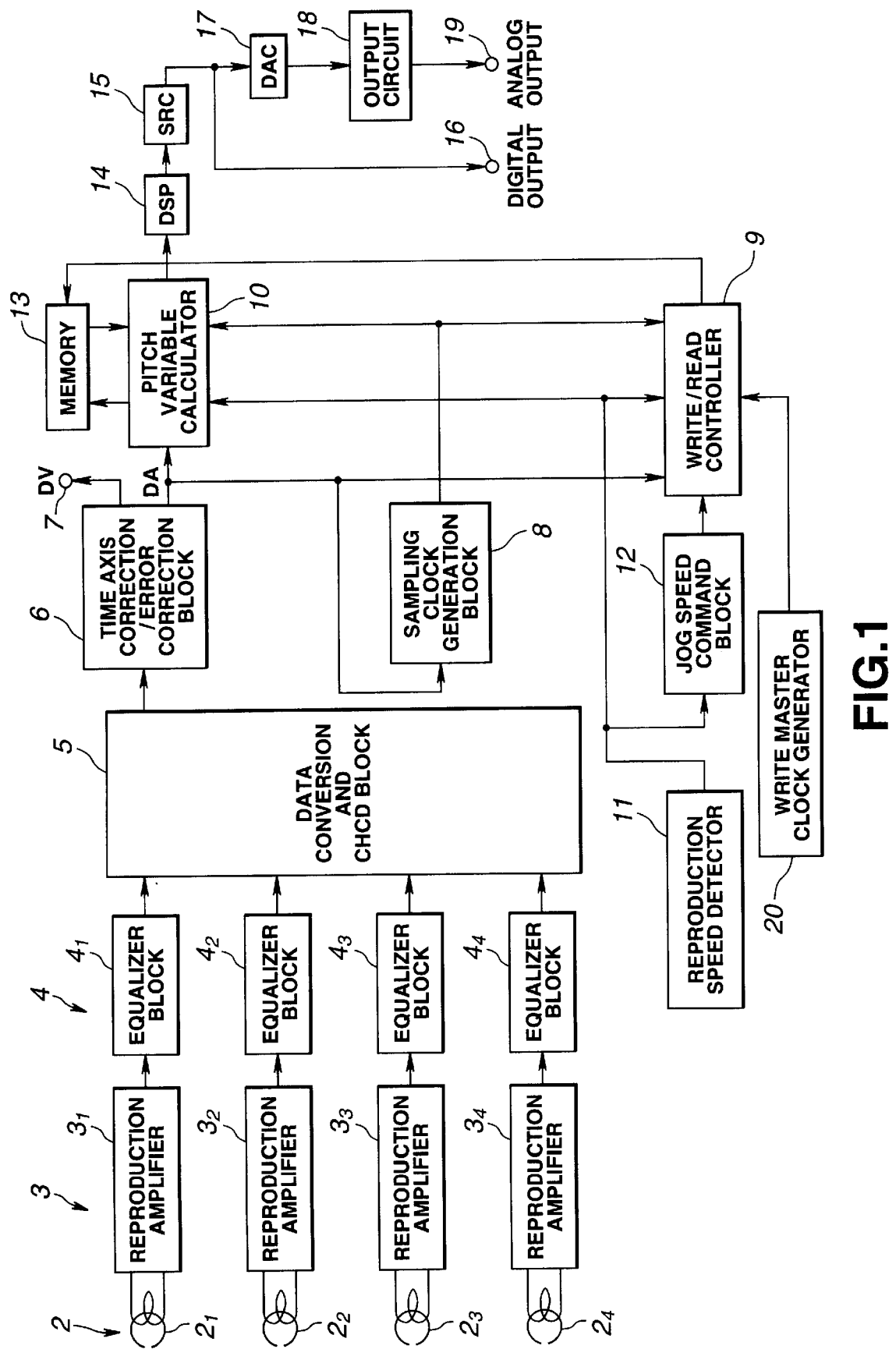
FIG. 1 is a block diagram showing a configuration of a digital VTR according to an embodiment of the present invention.

FIG. 1 shows a configuration of an audio signal reproduction apparatus block of the digital VTR 1. Firstly, explanation will be given on the configuration and operation of the audio signal reproduction block of the digital VTR 1 with reference to FIG. 1.

This digital VTR 1 includes four magnetic heads $2_1$, $2_2$, $2_3$, $2_4$ as the read-in rotary magnetic head block 2.

Figure 2:
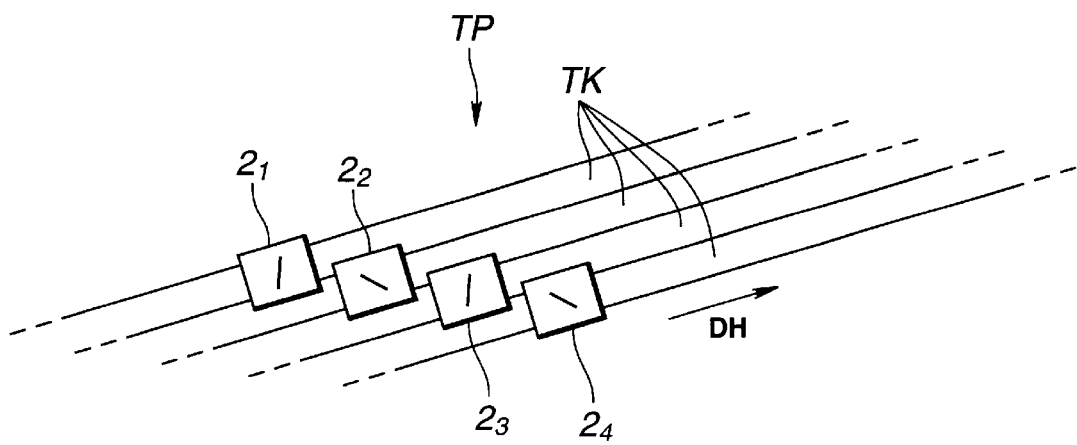
FIG. 2 shows travel on a magnetic tape of the four magnetic heads of the rotary magnetic head block for reading the digital VTR.

As shown in FIG. 2, these four heads $2_1$, $2_2$, $2_3$, and $2_4$ travels along the four adjacent tracks among a number of inclined recording tracks TK formed on the magnetic tape TP substantially simultaneously. The magnetic head block may be of a single head configuration and multi-head configuration.

A digital data which has been read from the magnetic tape TP by the magnetic heads $2_1$, $2_2$, $2_3$, and $2_4$ can be obtained from the read-in rotary magnetic head block 2. Since this digital data is a television signal, it consists of a video data, an audio data, and a control data. This digital data is amplified by a reproduction amplifier block 3 consisting of four reproduction amplifiers $3_1$, $3_2$, $3_3$ and $3_4$ before supplied to an equalizer block 4 consisting of four equalizer blocks $4_1$, $4_2$, $4_3$, and $4_4$. The frequency characteristic, delay characteristic and the like are equalized so as to obtain an optimal error rate.

The digital data which has been equalized by the equalizer block 4 is further supplied to a data conversion & channel decoding (CHCD) 5. The data conversion & CHCD block 5 rearrange the aforementioned digital data in a normal order and channel decodes the digital data, which is supplied to a time axis correction/error correction block 6.

The time axis correction/error correction block 6 corrects the time axis of the digital data arranged in a normal order and decoded, and performs error correction processing for an error data detected by inner parity and outer parity of the video data and the audio data. Furthermore the video data DV is isolated from the audio data DA, and the video data DV is supplied from an output terminal 7 to a video data processor (not depicted). The audio data isolated here includes an ID (identification) data, AAUX data (audio related data), audio data and the like.

The audio data DA from the time axis correction/error correction block 6 is supplied to a sampling clock generation circuit 8, a memory write/read controller 9, and pitch variation calculator 10.

The sampling clock generation circuit 8 generates bit clock BCK, clock LRCK and other read master clocks of a frequency 256 Fs (Fs: audio sampling frequency) according to the channel mode/sampling frequency/quantization bit information in the aforementioned AAUX audio data.

The memory write/read controller 9 decodes the data indicating the audio frame sampling count in the aforementioned AAUX data, and using this decoded value, speed information from the reproduction speed detector 11 and an enable control pulse from the jog speed command block, performs address control of the memory 13.

Here, the speed information is detected by the reproduction speed detector 11 from VTR reel and FG attached to a capstan. This speed information is supplied to the write/read controller 9, the pitch variation calculator 10, and the jog speed command block 12. Moreover, the aforementioned enable control pulse is a pulse for controlling enable of write data and is generated by the jog speed command block 12 according to the aforementioned speed information.

The pitch variation calculator 10 calculates the pitch of the digital audio data DA from the time axis correction/error corrector 6 according to the read master clock from the sampling clock generator 8 and the speed information from the reproduction speed detector 11. This pitch variation calculator 10 is connected to a memory 13 for storing at least one frame of the digital audio data DA supplied from the time axis correction/error corrector 6.

The digital audio data DA to be stored in the memory 13 is, for example, an audio information of one frame of a television signal read from 10 inclined recording tracks. When this one from of audio signal is recorded on a magnetic tape, interleave processing is performed. Accordingly, when storing the audio information in the memory 13, deinterleaving is required.

For this, the write/read controller 9 uses the arrangement position information calculated from the ID of the aforementioned audio data DA for deinterleaving and supplies a write-in address control signal to the memory 13 according to the write master clock from the write master clock generator 20.

Moreover, the write/read controller 9 supplies a read-out address control signal to the memory 13 according to the read-out clock from the sampling clock generator 8 so that the audio data stored DA in the memory 13 on frame basis successively so as to obtain a continuous audio information. This is the basic operation of the audio signal reproduction apparatus block.

In this digital VTR, if the jog reproduction mode is selected by a user to slow down the tape travel speed for reproducing the aforementioned television signal, the speed information from the reproduction speed detector 11 is changed by the pitch variation calculator 10 for switching between pitch fixed processing and a pitch variable processing.

Hereinafter, a detailed explanation will be given on the operation of the digital VTR when the user has selected jog reproduction mode.

Now the user has selected the jog reproduction mode to perform a reduced speed reproduction. The reproduction speed detector 11 detects a current reproduction speed from the VTR reel and FG attached to the capstan and supplies the obtained information to the write/read controller 9, to the pitch variable calculator 10, and to the jog speed command block 12.

The jog speed command block 12 supplies the aforementioned enable control pulse to the write/read controller 9, so that the digital audio data DA is written into the memory 13 according to the aforementioned speed information.

The write/read controller 9 generates a write-in address control signal according to the aforementioned speed information, the enable control pulse, the write master clock, the interleave arrangement position information, and supplies the generated signal, so that the digital audio data DA is stored in the memory 13 while deinterleaving is performed.

The digital audio data DA which has been read from the memory 13 is then subjected pitch control in the pitch variable calculator 10.

Figure 3:
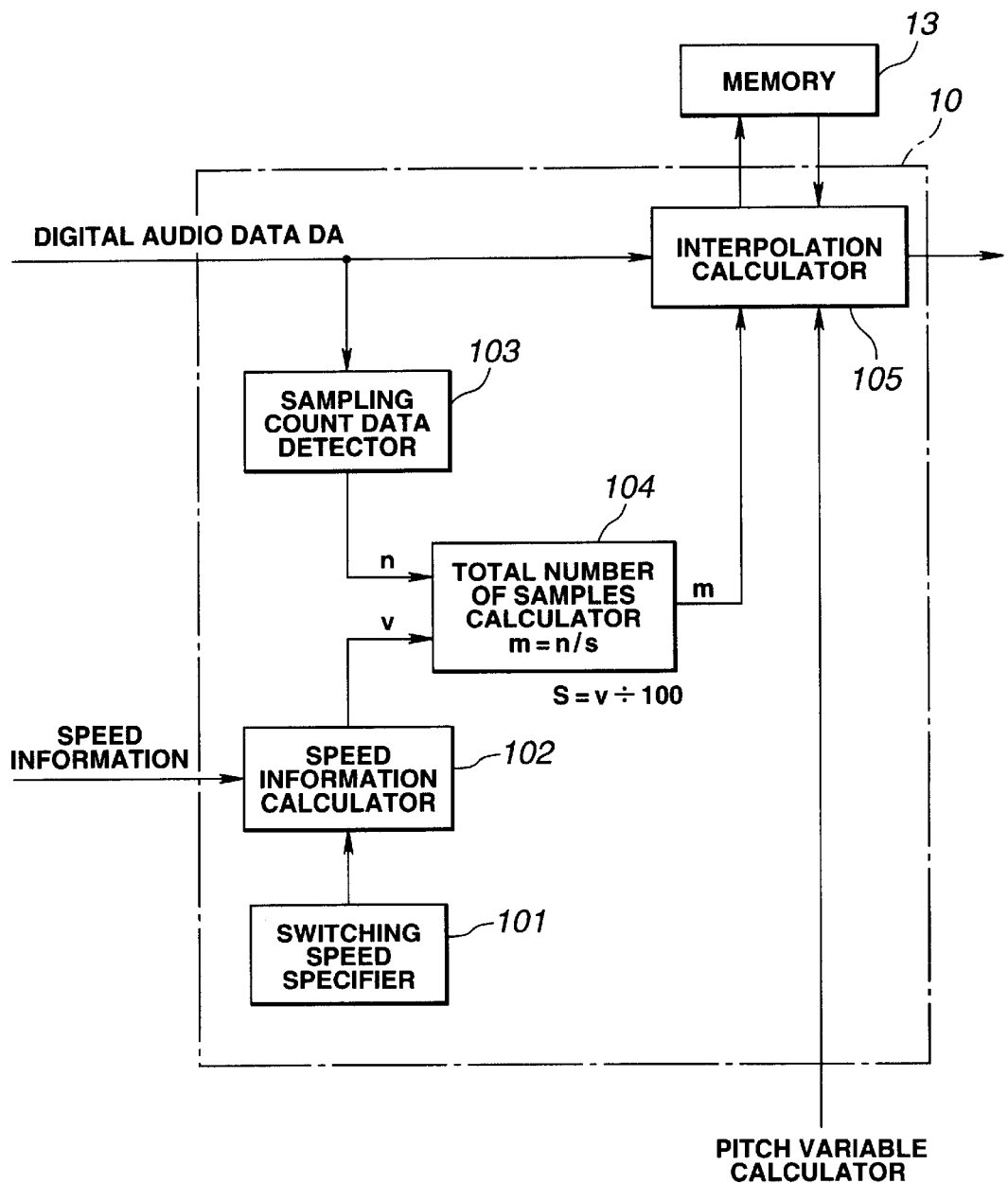
FIG. 3 is a block diagram of a pitch variation calculator which is an essential portion of the present invention.

FIG. 3 shows a configuration of the pitch variable calculator 10.

In FIG. 3, a switching speed specifier 101 generates a switching speed data for specifying switching speed between the pitch variable control and the pitch fixed control. The switching speed data is generated as "100"×1, ×½, ×⅓, ... 1/z.

If the speed information supplied from the reproduction speed detector 11 is greater than the switching speed data value output from the switching speed specifier 101, the speed information calculator 102 places the supplied speed information into 100×1, and if the seed information is smaller than the switching speed data, the speed information supplied from the reproduction speed detector 11, the speed information is output directly as a calculated speed information v. It should be noted that as will be detailed later, when the calculated speed information v is "100", an interpolation calculator 105 performs pitch fixing processing, and if less than "100", the interpolation calculator 105 performs pitch variation processing according to the calculated speed information v.

The sample count data detector 103 decodes a sample count per frame in the normal reproduction speed, which sample counter is contained in the AAUX data of the audio data DA, and the sample count detector 103 outputs a sample count data n.

According to the calculated speed information v and the sample count data n, the total sample count calculator 104 calculates a total number of samples m required for pitch variable processing as follows:

$$m = n \div (v \div 100)$$

and outputs it as the total sample count data. It should be noted that this total sample count m indicates a sample count (n÷s) required for expressing an audio data of one frame with the same sampling frequency as the sampling frequency during recording when performing lower speed S (S=v÷100, where S<1) reproduction.

The interpolation calculator 105, referencing the total sample count data m, calculates an interpolation data based on two adjacent audio data DA samples and inserts the interpolation between the two samples at an identical temporal interval, so as to create a changed reproduction data of total sample count m. It should be noted that when the calculated speed information v=100, the total sample count is equal to the sample count per one frame in normal speed (m=n), no interpolation data is inserted. In this case the pitch is fixed. Accordingly, the interpolation calculator 105 performs pitch variable processing when v<100.

It should be noted that the aforementioned interpolation by the total sample count calculator 104 and the interpolation processor 105 when v<100 is identical as the audio data interpolation processing in the digital data processing disclosed by the same inventor in Japanese Patent Application No. 8-242209.

Figure 4:
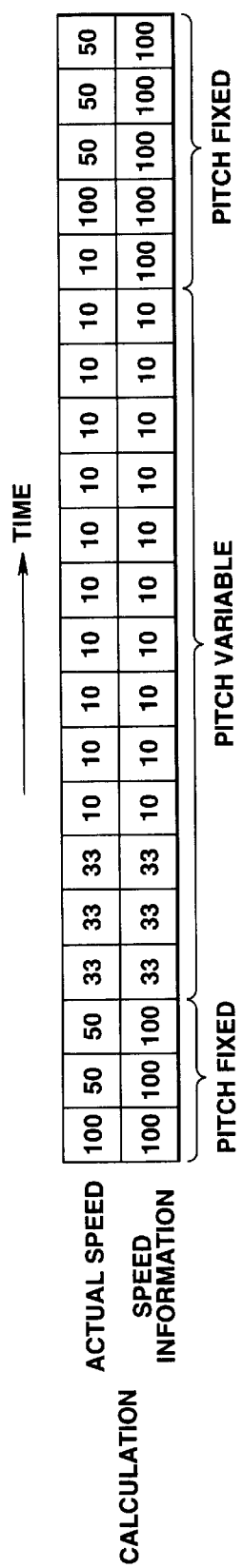
FIG. 4 explains the variable pitch and fixed pitch control in the digital VTR.

Now, in the pitch variable calculator 10, when the aforementioned digital audio data DA stored in the memory 13 is read out by the address control signal from the write/read controller 9, according to the specified speed of the switching speed specifier 101, the speed information calculator 102 converts the actual speed information from the reproduction speed detector 11, into the calculation speed information as shown in FIG. 4 and determines the period of time for pitch fixed or pitch variable.

In FIG. 4, if ×1 speed is assumed to be 100, ×½ speed is 50, ×⅓ is 33, and ×¹⁄₁₀ is 10. The switching point between the pitch fixed period and the pitch variable period is when the actual speed has become ×⅓ or below.

In the pitch fixed period, the same pitch as the normal ×1 is applied, and as the calculated speed, information of 100 is repeated. In the pitch variable period, the actual speed is changed in combination with the aforementioned calculated speed.

The total sample count calculator 104 receives a calculated speed information v from the speed information calculator 102 and a sample count data n from the sampling count data detector 103 calculates the number of samples required for expressing one frame of variable reproduction data with sampling cycle equal to the sampling frequency during recording as follows:

$$m = n \div (v \div 100)$$

wherein "100" represents a calculated speed in a normal speed. As has been described above, during a term when pitch is to be fixed, the calculation speed information v is set to "100" and in this case, the total sample count information m is output as a value identical to the sample count n of one frame. The total sample count data m is supplied to the interpolation calculator 105.

When m is not equal to n, i.e., in a period of variable pitch, the interpolation calculator 105 generates an interpolation data according to the data sample count and the recording medium travel speed and inserts the interpolation data into the audio data DA subjected to the pitch conversion, at an identical time period.

For example, when a digital audio data DA read from the memory 13 is reproduced at ⅕ speed, four interpolation data samples are inserted. Thus, interpolation calculator 105 can make the sample synchronization in a variable reproduction mode substantially according to a predetermined sample synchronization.

In the example of FIG. 4, the actual speed is equal to or less than the ×⅓ speed and when the pitch variable is set in, the interpolation data samples are inserted at an identical period of time. It should be noted, that when the total sample count data m is equal to n, no interpolation data samples are formed and the pitch is fixed.

The digital audio data DA calculated by this pitch variable calculator 10 is sent to the digital signal processor (DSP) 14 and subjected to filtering and other digital processing before supplied to the sampling rate converter (SCR) 15. In the SCR 15, the audio digital data DA from the DSP 14 is rate converted by the sampling clock locked to the output system and output as a digital output from an output terminal 16.

Moreover, the digital audio data DA from the SCR 15 is supplied to a digital analog converter (DAC) 17 to be converted into an analog signal and amplified by the output circuit 18 before output as an analog output from an output terminal 19.

Accordingly, in the aforementioned digital VTR, when reproducing the speed is equal to or less than ×⅓ speed, the pitch variable processing and the pitch fixed processing automatically switched from one to the other. For this, when the actual speed is ×½ reproduction, the pitch is fixed, which enables to understand the contents of conversation and to separate words from one another. Moreover, if music source, the melody can easily be recognized, which increases the edition efficiency. Even when there are a number of data conceals, the aforementioned interpolation data is inserted, and the frequency of the noise component offensive to the ear will not be lowered. This gives a clear sound.

Although the pitch fixed is preferably −1, pitch can also be fixed at ×½ or ×2. Moreover, the pitch variable is preferably performed in accordance with the actual speed, but it is also possible to handle the ×¹⁄₁₀ speed as ×⅕.

Moreover, the switching timing between the pitch fixed and pitch variable is preferably from ⅓ to ⅕, but it is also possible to switch at ½ speed.

According to the present invention, even in reduced speed reproduction, the pitch fixed region and the pitch variable region are automatically switched so that the contents of conversation and melody of music source can easily be recognized, and it is possible to obtain a clear sound.

What is claimed is:

1. An audio signal reproduction apparatus for reproducing a digital audio signal based on a predetermined number of samples which have been recorded on a recording medium, said apparatus comprising:

a reproduction means for reproducing from the recording medium the digital audio signal based on the predetermined number of samples;

a pitch control means for performing pitch control of the digital audio signal reproduced;

a speed detection means for detecting a reproduction speed of the recording medium from elements of a travel mechanism of the recording means; and a pitch decision means responding to the output of the speed detection means, and in a case if the reproduction speed of the recording medium is lower than the travel speed of the recording, so that the pitch control means decides a pitch variable period and a pitch fixed interval.

2. An audio signal reproduction apparatus as claimed in claim 1, wherein the pitch control means includes:

a sample count identification means for identifying the sample count of the digital audio signal based on the predetermined number of samples;

a total sample count calculation means for counting the total number of samples used for the pitch control, using the sample count data identified by the sample count identification means and a reproduction speed information of the recording medium; and interpolation calculation means for generating an interpolation data for said pitch control according to the data indicating the total sample count calculated by the total sample count calculation means, wherein the pitch decision means has a speed information calculation means for converting the speed information from the speed detection means, into a speed information indicating a pitch variable period and a pitch fixed period, and supplying this modified speed information as a travel speed information of the recording medium, to the total sample count calculation means.

3. An audio signal reproduction apparatus as claimed in claim 2, wherein the pitch decision means further includes a pitch variable/pitch fixed specification means for forming a speed data for specifying the pitch variable period or the pitch fixed period, wherein according to the speed data, the speed information calculation means modifies the speed information corresponding to the pitch fixed period, to a value identical to a normal reproduction speed of the recording medium.

4. An audio signal reproduction apparatus as claimed in claim 3, wherein the pitch variable/pitch fixed specification means outputs a speed data to specify the pitch fixed period when the reproduction speed of the recording medium is ⅓ to ⅕ speed mode.

5. An audio signal pitch control method when reproducing a digital audio signal based on a predetermined number of samples, at a speed different from the speed of the recording medium travel during recording, said method comprising:

a reproduction step for reproducing from the recording medium the digital audio signal based on the predetermined number of samples;

a pitch control step for performing pitch control of the digital audio signal reproduced in the reproduction step;

a speed detection step for detecting a reproduction speed of the recording medium from elements of a travel mechanism of the recording means; and a pitch decision step for deciding the pitch in response to the output of the speed detection step, so that if the reproduction speed of the recording medium is lower than the travel speed of the recording, the pitch control step decides a pitch variable period and a pitch fixed interval.

* * * * *